Oct. 14, 1969  D. D. ELLIOTT ET AL  3,473,021
RADIOACTIVE SENSOR FOR MEASURING LIQUID LEVELS
Filed June 27, 1966  2 Sheets-Sheet 1
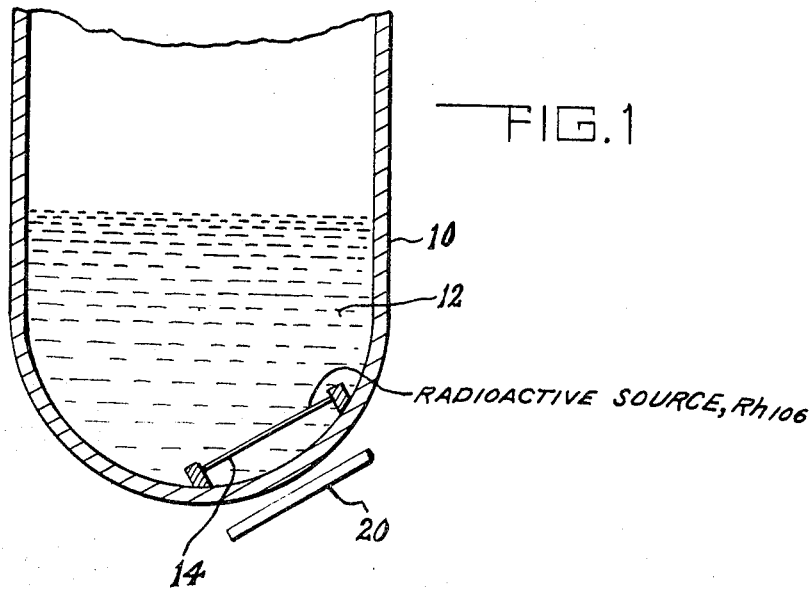
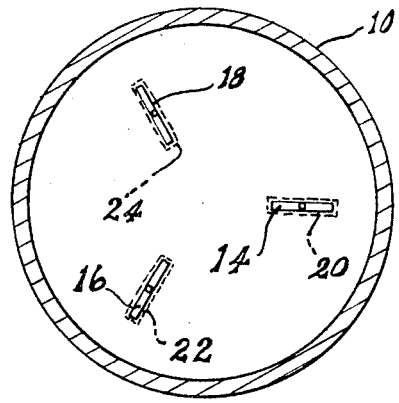
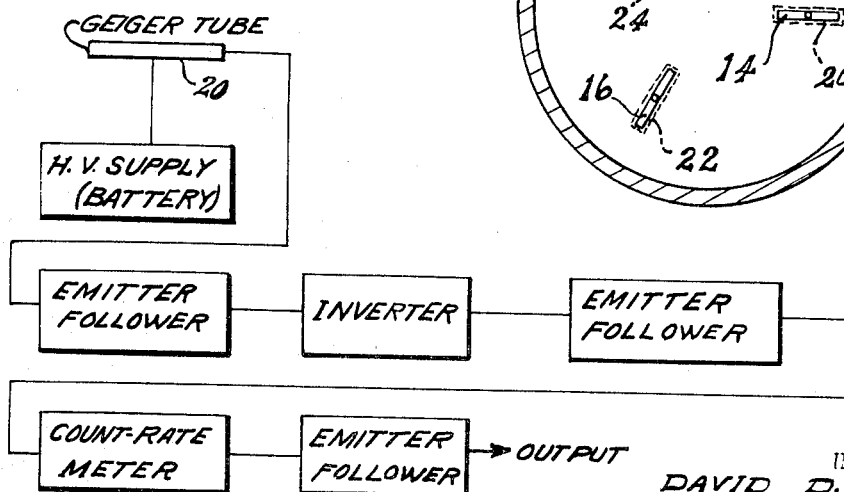
INVENTORS.
DAVID D. ELLIOTT,
FORREST S. MOZER
BY Harry A. Herbert Jr
William J. O'Brien
ATTORNEYS

United States Patent Office 3,473,021
Patented Oct. 14, 1969

3,473,021
RADIOACTIVE SENSOR FOR MEASURING LIQUID LEVELS
David D. Elliott, Los Angeles, and Forrest S. Mozer, Berkeley, Calif., assignors, by mesne assignments, to the United States of America as represented by the Secretary of the Air Force
Filed June 27, 1966, Ser. No. 561,665
Int. Cl. G01n 21/26, 23/12; H01j 37/00
U.S. Cl. 250—43.5                                        2 Claims

ABSTRACT OF THE DISCLOSURE

An apparatus which utilizes nuclear radiation for measuring liquid levels in the fuel tanks of gyrating aircraft. The apparatus comprises a plurality of elongated radiation sources positioned within the interior portion of a fuel tank together with an equal number of detection devices positioned outside the tank and opposite to the radiation sources.

---

This invention relates to the measurement of liquid level. More particularly, it relates to an apparatus which utilizes nuclear radiation sources for determining liquid levels in a tank or container.

Many systems have been employed heretofore in an attempt to determine accurately the fill level of a tank or container. Measuring devices based on the concept of using a nuclear radiation source in conjunction with a radiation detector are well known.

A variety of arrangements have been contemplated including the concept of positioning the detector outside the tank and opposite to the radiation source which in turn may be positioned either within the tank or on an exterior portion thereof. Basically, these systems measure liquid level through an arrangement that determines the degree of radiation passing through the tank and its liquid contents. As the liquid radiation absorptive material fills the space between the radiation source and detector, there is a decrease in the amount of radiation received by the detector. This decrease or difference can be measured and calibrated to indicate the level of the liquid in the tank.

One of the primary disadvantages of these prior art methods of liquid level detection, however, is their inability to determine an accurate fill level for tanks or containers which are positioned at an incline to their vertical axis. With the plane of the liquid surface off axis, the level indicating systems of the past give false values for the residual liquid level.

Consequently, the problem of providing an accurate measure of the fuel liquid level in the fuel tanks of gyrating aircraft and missiles is of paramount importance. The fluctuations and variations in the angle between the plane of the liquid fuel surface and the vertical axis of the vehicle's fuel tank contribute to an inaccurate fuel level reading. The need for solving this problem and providing a system that can determine with a fair degree of accuracy the residual fuel level of a fuel tank whose vertical axis may lie at an inclined angle to an axis normal to the surface of the fuel is obvious.

With the present invention, however, it has been found that an accurate measurement of liquid fuel level of a gyrating fuel tank is feasible and yields a residual volume with a high degree of accuracy. The invention contemplates broadly the concept of placing a plurality of elongated radiation sources within the interior of a fuel tank with an equal number of detection devices positioned opposite to the radiation sources and outside the tank. It has been found that three radiation sources positioned within the interior of the tank in a horizontal coplanar relationship of approximately 120° produce an optimum accuracy in determining liquid fuel level. However, placing the sensors at various angles to each other due to possible obstructions in the tank may be tolerated when the positioning does not seriously limit the accuracy of the system. The length of the radiation source is of importance in providing accuracy but, to a great extent, the proper length depends upon and is determined by the configuration and depth of the fuel tank.

Accordingly, the primary object of this invention is to provide a system for accurately determining the fill level and residual volume of a tank or container.

Another object of this invention is to provide a system for measuring the amount of fuel contained within a fuel tank which is subjected to continuous movement and gyrations.

Still another object of this invention is to provide a system for measuring liquid level that employs a plurality of elongated radiation sources spaced from each other in a coplanar relation.

A further object of this invention is to provide a measuring system for determining the amount of liquid in a container irrespective of the relationship of the vertical axis of the plane of the surface of the fluid to the vertical axis of the container.

Still a further object of this invention is to provide a liquid level measuring system that is readily adapted for use with containers of varied configuration and size and is rugged and reliable and possesses a variety of applications.

Still further objects, advantages and features of this invention will become readily discernible upon consideration of the following detailed description taken in conjunction with the drawings, in which:

FIGURE 1 is an elevational view in cross section of the interior of a fuel tank showing the liquid level measuring system of this invention;

FIGURE 2 is a top view in cross section showing the position of the radioactive sources within the fuel tank;

FIGURE 3 is a block diagram of the electronic counting rate circuit of the invention;

Figure 5:
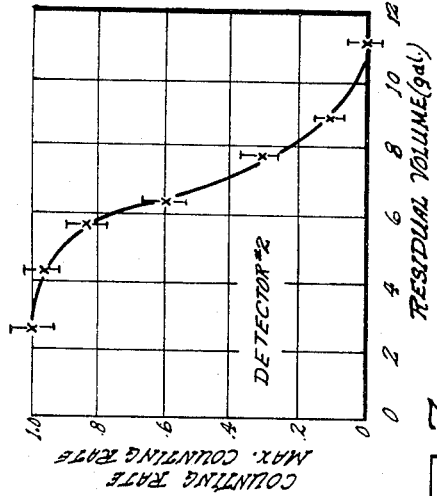
FIGURES 4, 5 and 6 are graphical illustrations of the counting rates of detectors plotted against residual liquid volume.

Referring now to FIGURE 1 of the drawings, the invention is shown as generally disposed in a fuel tank 10 for indicating the level of a liquid 12 contained within the tank. The liquid 12 is introduced or removed from the tank 10 by conventional inlet and outlet means (not shown). A sensor element 14, consisting of a radioactive source positioned within an elongated tube, is mounted at an inclined angle proximate to the inside wall of the fuel tank. The electrons which are emitted from the radiation source 14 are detected by a detector 20, preferably a radiation counting device of the Geiger tube type. The detector is placed opposite to the radiation source outside the fuel tank. When the source lies submerged below the level of the liquid fuel, the emitted electrons are absorbed by the fuel; but, as the fuel level falls exposing the source, the electrons penetrate the wall of the container 10 and are detected by the detector 20. The system is properly calibrated so that the Geiger tube counting rate constitutes a direct measurement of the residual fuel level.

Referring to FIGURE 2, there is disclosed a fuel tank 10 with three sensor elements 14, 16 and 18, respectively. The three elements are positioned at an inclined angle to the vertical in a horizontal coplanar relation to each other at angles of about 120°. Detection elements 20, 22 and 24 are positioned opposite to each sensor element.

A suitable electronic counting rate circuit for use with each of the sensor elements of the invention is shown as a block diagram in FIGURE 3. The counting rate circuit consists of a Geiger tube 20 which is energized from a suitable source of high voltage. The negative pulses from the Geiger tube after being applied to an emitter follower are inverted and after being applied again to a second emitter follower are fed to a linear count-rate circuit comprising a count-rate meter, an emitter follower and a means for measuring the output. This method of monitoring the counting rate has the advantage that the output can be put on a commutated, narrow-band telemetry channel. Also, the data is more easily analyzed when presented directly in the form of counting rates.

As was appointed out heretofore, optimum results are achieved by utilizing three radiation sources or sensor elements spaced in a coplanar relation to each other at an angle of about 120° on the horizontal. However, during actual operations of the system of this invention, it was not possible to place the three sensor elements at the 120° angle separation due to obstructions in the particular fuel tank utilized during the testing operation. During calibration of the system and actual test operations, a radioactive $Rh^{106}$ β-source was utilized as the sensor element because of its high energy and end-point although other β-sources, as well as gamma sources, could be used. The $RH^{106}$ source was obtained in liquid form and sealed in a 10-inch long aluminum pipe. In order to collimate the electrons somewhat, the wall of the pipe opposite the Geiger tube was filed down in cross section. Due to the absorption of the source container and the tank wall, only electrons with energy greater than about 2 mev. were detected in the Geiger tube. With water filling the space between the radioactive source and the tank wall the electron energy necessary to penetrate to the Geiger tube was 5 mev., which is well above the end-point energy of the $Rh^{106}$ β-source. Water was employed during calibration and test operations in order to simulate the fuel normally present in the fuel tank.

An Anton type 106C Geiger tube with a sensitive length of about four inches was employed as the detector for measuring the emission from the radioactive source. With a high voltage of 1000 volts and with the Geiger tube driving an emitter source, the pulses were normally 10 volts. For convenience in making the tests runs without vehicle power available, the high voltage was supplied by two 500 volt dry cell batteries in series. At the maximum counting rate of 2000 counts per second the current drain of one Geiger tube was about 50μ amperes. The negative pulses from the Geiger tube 24 were inverted and fed to a linear count-rate circuit which gave a 0 to 5 volt positive D.C. output proportional to the counting rate. As the fuel is expelled from the tank, the sensor elements become fully exposed in the order of a second. Consequently, the response time of the count-rate circuit disclosed in FIGURE 2 was chosen to be 0.1 second. This is the time required for the circuit to respond to a change in counting rate. The power consumption of the circuit utilized during the testing of the system of this invention was less than one-quarter watt for each of the three Geiger tube circuits employed in determining the counting rate emanating from each of the three sensor elements.

From the counting rates of the three sensor elements 14, 16 and 18, the residual volume and the angle between the normal to the surface of the fuel and the vehicle axis can be inferred.

Figure 7:
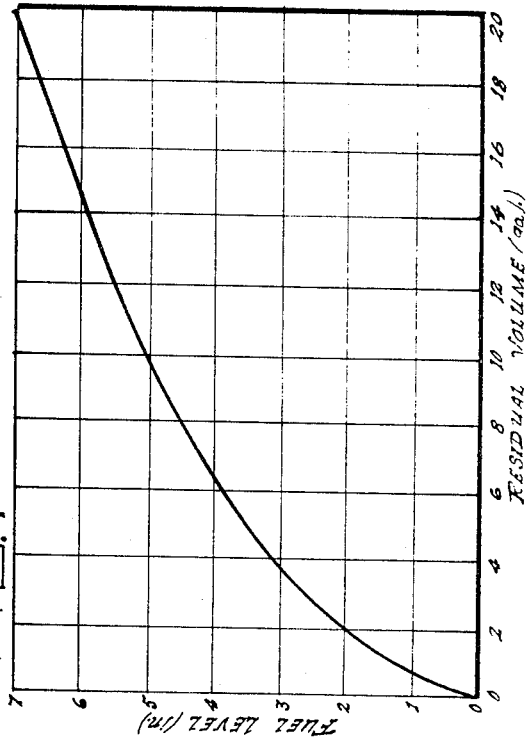
FIGURE 7 is a plot of the height of the residual liquid level as a function of the residual volume in a fuel tank.
Figure 4:
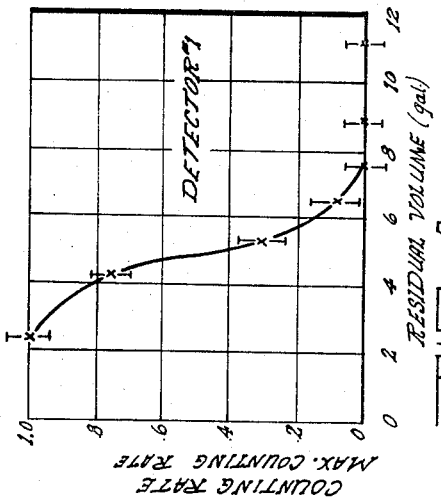
Figure 6:
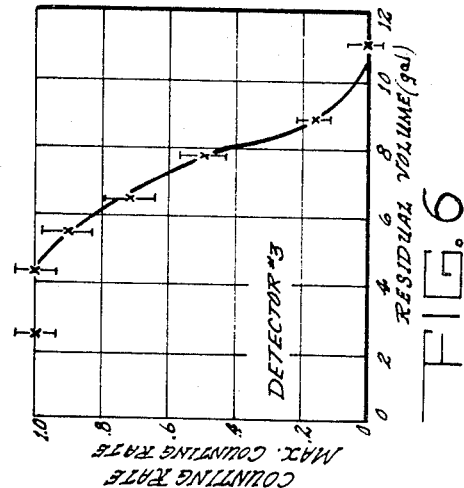

Calibration of the system of this invention was made during a static test when the fuel tank was held in a vertical position. Water was utilized as a simulated fuel. It was assumed that the surface of the water remained perpendicular to the vertical axis of the tank during the time when the water was being expelled. The output voltages from the three sensors were recorded with a Visicorder. From the measured rate from which the water flowed out of the fuel tank and the measured residual volume of water remaining in the tank after the flow stopped (hereinafter this will be referred to as the residual volume after turn-off), calibration curves for each of the three detectors were determined. These curves are disclosed in FIGURES 4, 5 and 6 for detectors 1, 2 and 3, respectively, with the fraction of the maximum counting rate (source fully exposed) as a function of the residual volume. The uncertainties assigned to the points are the measured maximum errors in the output voltages. The RMS statistical error would be two-thirds of the maximum error. The residual volume can be converted to the height of the fuel level measured from the bottom of the tank using the curve of FIGURE 7. For a typical residual volume after turn-off of three gallons, a 10 percent uncertainty in the measured volume would correspond to a 5 percent uncertainty in the height, or 0.15 inch. The RMS statistical error in the output voltage is given by $$\frac{\Delta v}{v} = \frac{1}{\sqrt{2n\tau}} \qquad (1)$$

where $n$ is the counts per second and $\tau$ is the response time of the circuit. The statistical error is about 10 percent at the maximum counting rate.

Results of a static test run are presented in Table I.

TABLE I

| Sensor No. | Fraction of maximum counting rate at turn-off | Residual volume indicated (gal.) |
|---|---|---|
| 1 | 0±0.04 | Vol. >6 |
| 2 | 0.2±0.2 | Vol. >7 |
| 3 | 0.4±0.1 | 7½±½ |

From the data set forth in Table I, the residual volume would be taken to be 7½±½ gallon. The actual measured residual was 7 gallons which falls within the error of measurement. The fact that the output from one sensor bracketed the residual volume while the other two gave only lower limits was due to the small range of residual volumes over which the sensors operated. This range can be increased, obviously, by using longer sensor elements that extend further up the fuel tank wall.

A dynamic test of the apparatus of this invention was also conducted. During the dynamic test runs the normal to the surface of the water made an angle of 5 degrees with respect to the longitudinal axis of the fuel tank at the time of turn-off. The fuel tanks were centrifuged at 45.5 r.p.m. with the distance from the axis of rotation to the bottom of the fuel tank being 138 inches. The axis of the fuel tank was tilted down by approximately 12 degrees with respect to the horizontal. For a nominal residual fuel level after turn-off of a few inches, the normal to the water surface would therefore have subtended an angle of 7 degrees with respect to the horizontal and 5 degrees with respect to the vehicle axis. Inasmuch as two of the three sensor elements were close together and nearly opposite the third sensor element, the average residual volume, which differs from the residual volumes measured by the three individual sensors ($V_1$, $V_2$ and $V_3$) because of the angle between the surface normal and the tank axis, is given as $$V_{ave.} = \frac{2V_1 + V_2 + V_3}{4} \qquad (2)$$

It is also possible to estimate the angle between the surface normal and the tank axis from the three readings.

The results of the dynamic test runs are presented in Table II.

TABLE II

| Run No. | True residual vol. (gal.) | Sensor No. | Fraction of max. counting rate at turn-off | Residual vol. indicated (gal.) | Average residual vol. (gal.) | Estimated angle Between surface normal and tank axis |
|---|---|---|---|---|---|---|
| A | 8.4 | 1 | 0.06±0.04 | >6 | | |
|   |     | 2 | 0±0.04    | >9 | | |
|   |     | 3 | 0.03±0.05 | >9 | | |
| B | 5   | 1 | 0.8±0.1   | 4±½ | | |
|   |     | 2 | 0.4±0.15  | 7±1 | 5½±1 | 2°±1° |
|   |     | 3 | 0.45±0.05 | 7½±½ | | |
| C | 5.8 | 1 | 0.6±0.2   | 4½±½ | | |
|   |     | 2 | ±0.2      | >8 | 6±1 | 2°±1° |
|   |     | 3 | 0.2±0.15  | 8½±½ | | |

The true residuals fall within the range of values measured by the sensors, but the uncertainties are roughly twice the 10 percent error due to statistical fluctuations. The reason for this larger uncertainty was that superimposed on the statistical variations was a secular oscillation of the counting rates with a period of about one second. This can be interpreted as the effect of surface waves and would set a lower limit of about 10 percent on the error in measuring residual volumes by the method of this invention.

The level measuring system of this invention has been shown to be a feasible method for measuring residual fuel volumes and liquid levels for liquid containing tanks whose axis may be positioned at an inclined angle.

Although the invention has been described and illustrated in detail, it is to be clearly understood that the same is by way of illustration only and is not to be taken by way of limitation, the spirit and scope of this invention being limited only by the terms of the appended claims.

What is claimed is:

1. An apparatus for measuring residual liquid level comprising a liquid container having a vertical axis, a plurality of elongated radiation sources fixedly located within said container in a coplanar, spaced relation to each other at an inclination to the vertical axis of said container, a plurality of elongated radiation detectors located without said container adjacent to and in position to receive the respective radiations from said sources, circuit means for energizing said detectors and means responsive to the radiation received by said detectors for indicating the output thereof whereby said respective radiation outputs may be averaged and converted into residual liquid level.

2. An apparatus as defined in claim 1 wherein said radiation sources are equiangularly spaced.

References Cited
UNITED STATES PATENTS

| | | | |
|---|---|---|---|
| 2,953,682 | 9/1960 | Frank et al. | 250—43.50 |
| 3,110,890 | 11/1963 | Westcott et al. | 73—290 X |
| 3,170,064 | 2/1965 | Martin. | |
| 3,254,211 | 5/1966 | Black. | |

RALPH G. NILSON, Primary Examiner

D. L. WILLIS, Assistant Examiner

U.S. Cl. X.R.

73—290; 250—83.3